United States Patent
Neilson

[11] 3,944,306
[45] Mar. 16, 1976

[54] ROCK BIT BEARING SEAL
[75] Inventor: William J. Neilson, Whittier, Calif.
[73] Assignee: Smith International, Inc., Newport Beach, Calif.
[22] Filed: Dec. 16, 1974
[21] Appl. No.: 533,271

[52] U.S. Cl............ 308/187.1; 277/95; 277/235 R; 308/8.2; 308/36.1
[51] Int. Cl.² ......................................... F16C 33/78
[58] Field of Search ........ 308/8.2, 36.1, 187, 187.1; 175/371, 372; 277/92, 94, 95, 235 R

[56] References Cited
UNITED STATES PATENTS

| | | | |
|---|---|---|---|
| 3,137,508 | 6/1964 | Cunningham | 277/95 |
| 3,370,895 | 2/1968 | Cason, Jr. | 308/8.2 |
| 3,588,201 | 6/1971 | Schmidt | 308/36.1 |
| 3,603,602 | 9/1971 | Padula | 277/235 R X |
| 3,656,764 | 4/1972 | Robinson | 308/8.2 X |
| 3,862,762 | 1/1975 | Millsap | 308/8.2 X |

Primary Examiner—Albert J. Makay
Assistant Examiner—Randolph A. Reese

[57] ABSTRACT

A bearing seal for a rock bit, including a non-elastic annular core member and inner and outer flexible sealing rings each securely bonded to the core member throughout substantially its entire circumference, the core member providing dimensional stability for the sealing rings and hence extending the useful life of the bearing seal despite the elevated temperature and pressure levels to which it is subjected.

22 Claims, 18 Drawing Figures

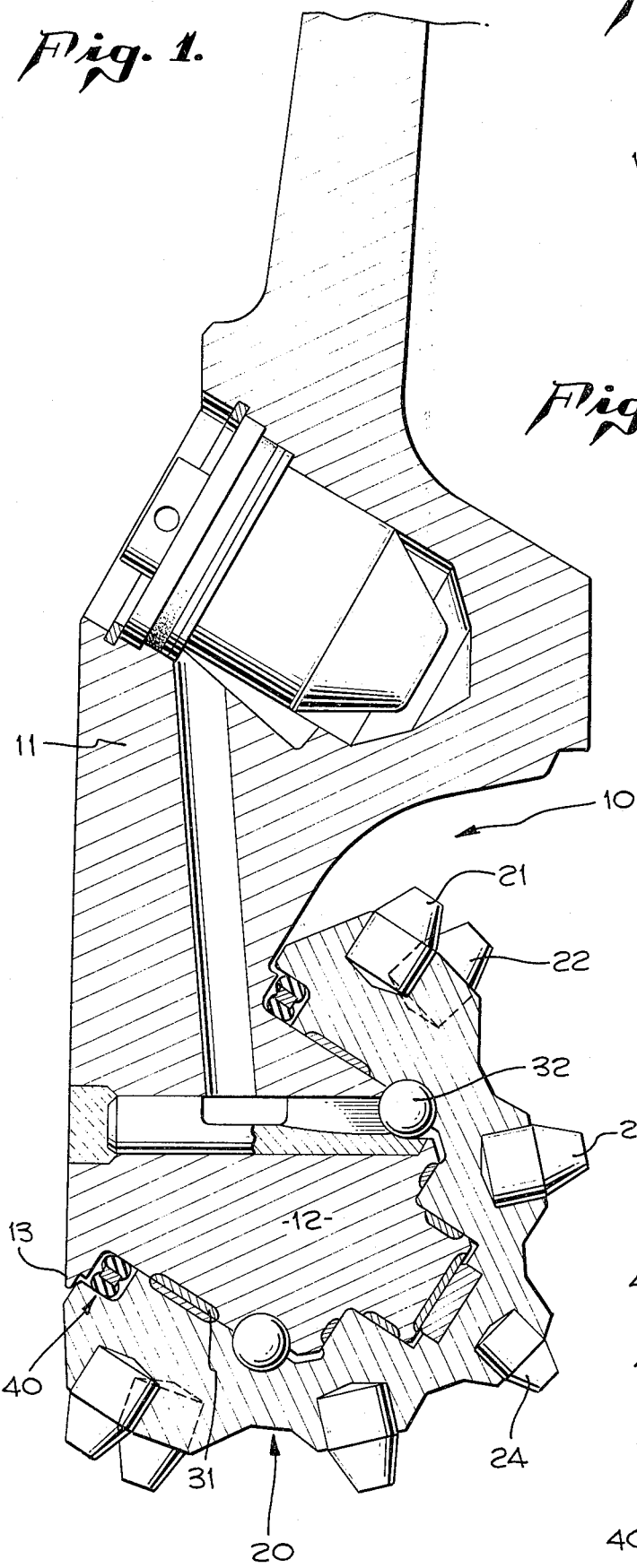

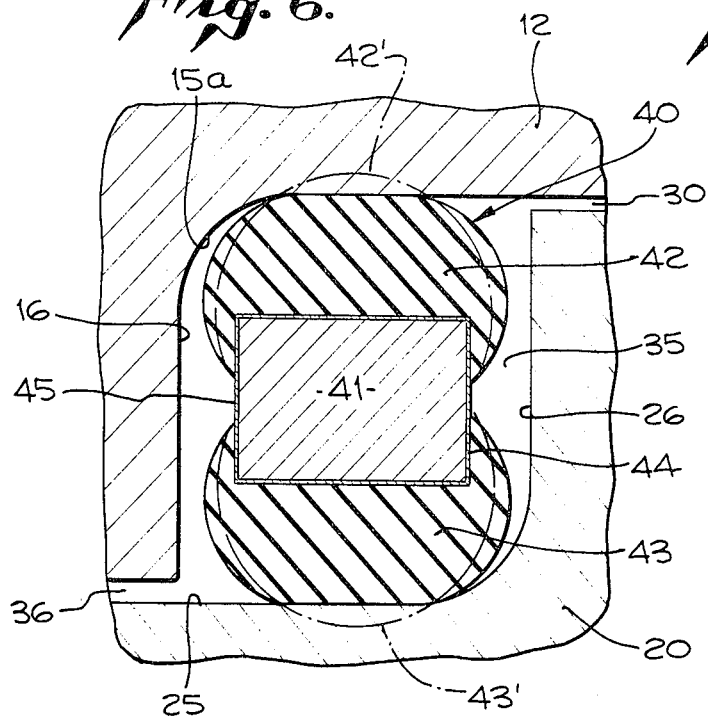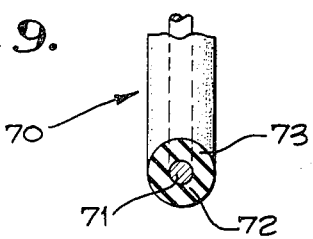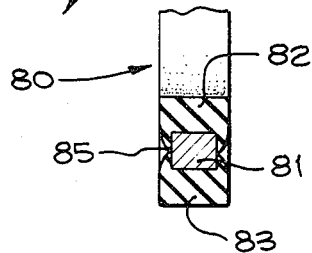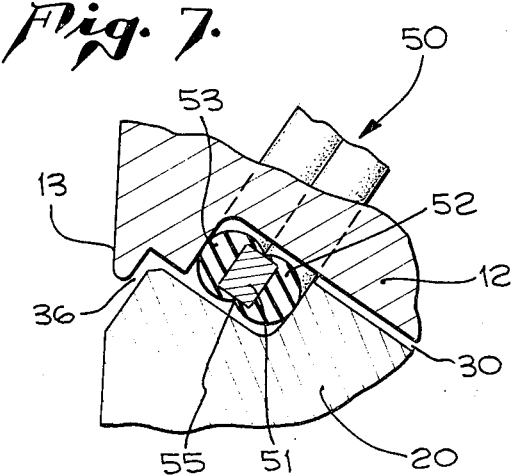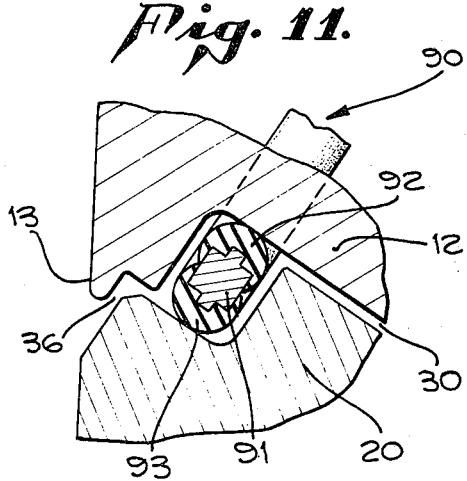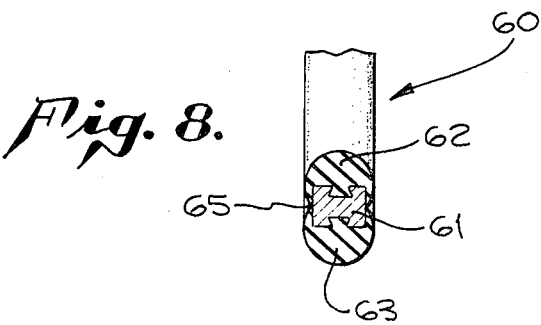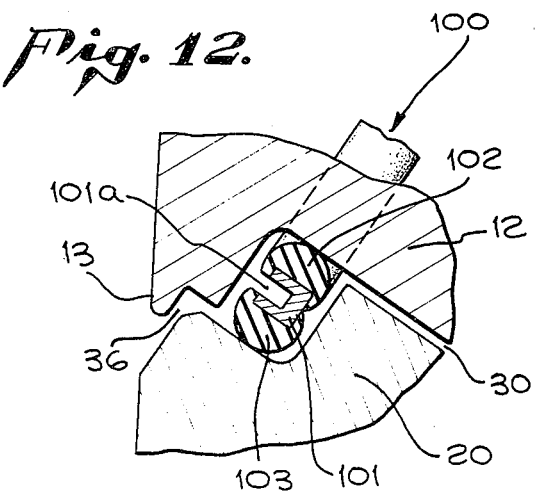

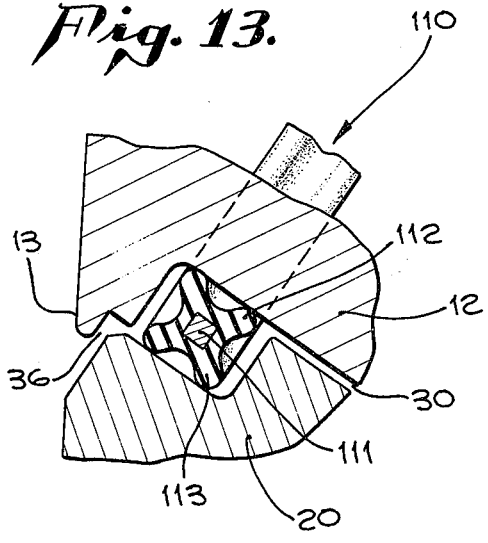
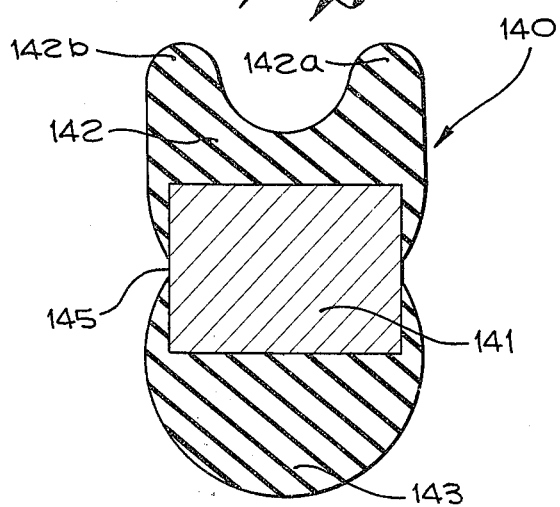
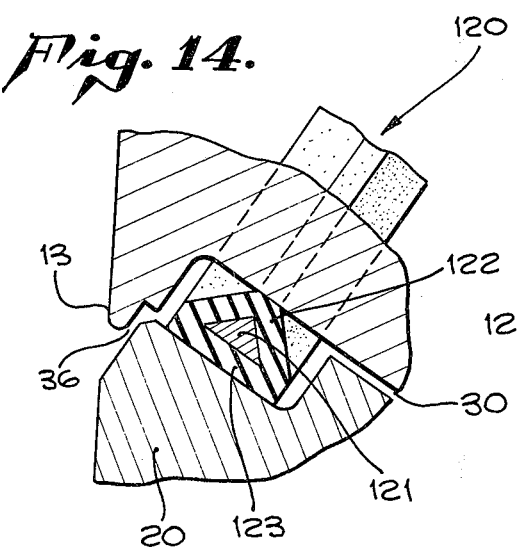
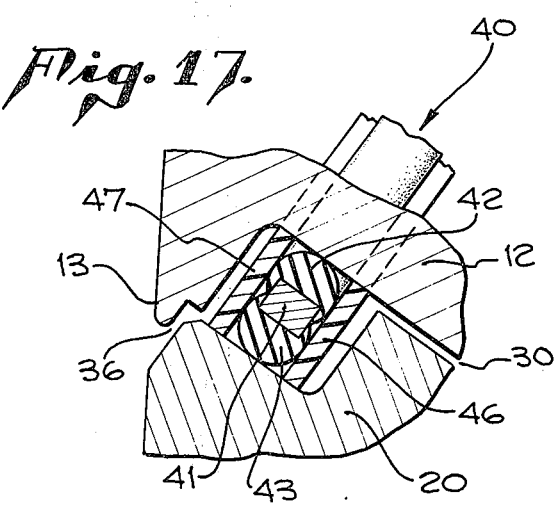
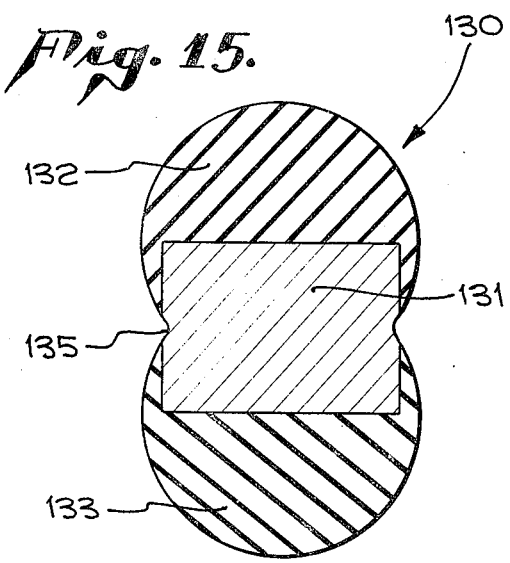
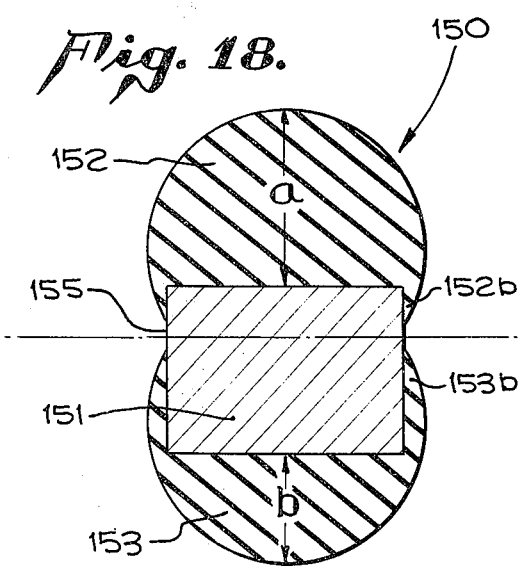

ROCK BIT BEARING SEAL

BACKGROUND OF THE INVENTION

Bearing seals for various different applications must be designed to meet various operating requirements such as pressure differential to be applied across the seal, intrusion by mechanical and/or chemical contaminants, operating temperature levels, and the like. The bearing seals used in rock bits, and particularly rock bits for drilling deep oils wells, must operate under relatively unique conditions.

The conventional design of rock bit bearing seals avoids, insofar as feasible, the application of any pressure differential across the seal. This is achieved by utilizing in the internal lubrication system of the rock bit a pressure sensing and pressure equalizing system whose purpose is to equalize the internal pressure of the lubricant with the ambient pressure of drilling mud or other drilling fluid that occupies the well bore. As a result of these conventional pressure equalizing systems the pressure differential across the bearing seal is limited, hopefully, to perhaps one pound per square inch.

Nevertheless, rock bit bearing seals operate under extremely demanding conditions. Some type of flexible sealing medium is necessarily utilized in the structure of the seal. As the depth of the well bore increases, the ambient pressure of the drilling fluid also increases in substantially linear fashion and typically reaches a pressure level of many thousands of pounds per square inch. At the same time the necessary rotation of the rock bit, and pulverization of the rock material which it encounters, engender large amounts of heat which is not easily dissipated. The rock bit bearing seal, therefore, operates under levels of both pressure and temperature which are extremely high compared to any other types of rotating seal applications.

There is in addition, a severe problem of contamination of rock bit bearing seals. The continuous circulation of the drilling fluid carries away many small or minute particles of pulverized rock which are entrained within the drilling fluid, and the exterior side of the bearing seal is continuously subjected to these particles. Many particles enter the seal with resultant damage which drastically limits the useful life of the seal and hence of the entire rock bit.

PRIOR ART

Prior art patents include for example, the Galle U.S. Pat. No. 3,397,928 and the Robinson U.S. Pat. No. 3,656,764. As these references illustrate, it has been the practice to provide an "O" ring seal between the rotary cutter and the journal leg which extends from the main bit body for supporting the cutter. One purpose of the seal is to confine a lubricant within the internal bearing system of the rock bit so that it will not be unnecessarily lost or consumed, and the other purpose of the seal is to prevent drilling mud and cuttings from the rock formation from entering the journal or bearing area.

Metal cored O-rings have been offered on the commercial market as early as 1958, as indicated by catalog number 204 of the National Seal Division of Federal-Mogul-Bower Bearings, Inc. of Redwood City, Calif. However, metal cored O-rings apparently have not been utilized in rock bit bearing seals.

SUMMARY OF THE INVENTION

According to the present invention a composite seal structure is provided which includes a non-elastic annular core member, preferably made of metal, and flexible inner and outer sealing rings each of which is securely bonded to the core member throughout substantially its entire circumference. The core member is rigid and dimensionally stable and exhibits a negligible amoount of compression or distortion resulting from the elevated pressure level encountered in the well bore. The surface of each sealing ring that is in contact with the core member, being firmly bounded to the core member, is thereby secured against movement or slippage either radially, axially, or circumferentially. The outer surfaces of the sealing rings, remote from the core member, remain free to move, expand or contract, or yield, in response to pressure, temperature, contaminants, or other factors.

In its preferred form the invention specifically provides for dissipation of heat generated in the bearing seal. On the exterior side of the seal an annular gap is maintained between the two sealing rings, in which the flexible sealing medium is either entirely absent or else exists in a very thin layer covering the core member, and hence the drilling fluid coming into contact with this gap conveys heat energy away from the core member of the seal.

In the preferred form of the invention the core member is made of metal and has a cross-sectional area which is substantially equal to the cross-sectional are of either the inner sealing ring or the outer sealing ring. It is also preferably to closely match the thermal coefficient of expansion of the metal core member to the adjacent metal parts of the journal leg and the rotary cutter.

In the preferred form of the invention the seal is preferably radially arranged, with the inner and outer sealing rings lying in the same plane with the core member. It is also preferred to have the radial thickness of the composite seal be about 1½, or more, times its axial length.

While as stated above it is preferred for heat dissipation purposes to maintain on the exterior surface of the seal an annular gap in which the metal core is not covered by either of the sealing rings, it is at the same time preferred that the sealing rings be of such configuration as to protect the metal core from any metal-to-metal contact with an adjacent metal surface of the seal gland, whether on the journal leg or on the rotary cutter.

A conventional "O" ring, made entirely for an elastomer, when subjected to tension and heat, shrinks beyond its normal tension. This is known as the Gow-Joule effect. Not only does it produce improper fit of the "O" ring seal so that it does not properly perform its sealing function, but excessive wear is caused on the "O" ring.

By providing the metallic core as part of the seal structure of the present invention, and bonding the sealing rings to the core, the tendency for the rings to constrict is overcome since the metallic core is not subject to the Gow-Joule effect. Therefore, the elastomeric portions of the seal will bear against the surfaces they are adapted to seal with the proper degrees of pressure to perform their sealing functions.

Since the seal retains its desired inner and outer diameters without being subject to the Gow-Joule effect, it is possible to maintain far more constant and exact sealing pressure than with a conventional "O" ring.

The object and purpose of the invention, therefore, is to provide a bearing seal, particularly for use in rock drills, which will successfully withstand the temperature, pressure, and contaminant conditions there encountered, hence extending the useful life of the rock drill.

DRAWING SUMMARY

FIG. 1 is a fragmentary sectional view of a rock bit embodying the present invention;

FIG. 3 is an enlarged fragmentary detailed view of the bearing seal of FIG. 1;

FIG. 3 is a perspective view of the metallic core of the bearing seal;

FIG. 4 is a cross-sectional view of the core taken on line 4—4 of FIG. 3;

FIG. 5 is a greatly enlarge transverse cross-sectional view of the seal structure of FIGS. 1 and 2;

FIG. 6 is a greatly enlarged view like FIG. 2, also showing in dotted lines the relaxed positions of the sealing rings prior to assembly of the seal;

FIG. 7 is a view like FIG. 2, but showing the seal structure in an axially disposed arrangement;

FIG. 8 shows a modified form of the radial seal of FIGS. 2 and 5;

FIG. 9 shows another modified or alternate form of the seal structure;

FIG. 10 shows yet another alternate form of the seal structure;

FIG. 11 shows a still different modification of the seal structure;

FIG. 12 shows a form of the seal structure with partially hollow core;

FIG. 13 shows a further modification of the seal structure;

FIG. 14 shows still a different form of the seal structure;

FIG. 15 shows yet another form of the seal structure;

FIG. 16 shows a still different form of the seal structure;

FIG. 17 shows the seal structure of FIG. 2 modified by the addition of back-up rings; and FIG. 18 shows yet another and unsymmetrical form of the seal structure.

PREFERRED EMBODIMENT

Reference is now made to FIGS. 1 through 6, inclusive, illustrating the presently preferred form of the invention.

As best seen in FIG. 1, a rock bit 10 includes a bit body 11 having a journal leg 12 extending therefrom. The shirttail portion of the bit body is designated by reference numeral 13. A rotary cutter 20, as shown in FIG. 1, is a conventional rotary cone cutter equipped with circumferential rows of teeth or inserts 21, 22, 23, and a forward cutter or insert 24. There is an annular clearance space 30 between the rotary cutter 20 and journal leg 12, and bearings 31 and ball bearings 32 are used to support the cutter 20 for rotation upon the journal leg 12. While the internal lubrication system is not specifically shown, it will be understood that a pressure equalizing mechanism is utilized, for the purpose of equalizing the pressure of lubricant occupying the clearance space 30 with that of drilling fluid occupying the surrounding well bore.

Referring now to FIG. 2, it will be seen that journal leg 12 has an outer cylindrical surface 15 which provides the radially inward surface of a seal gland, and a radial surface 16 which provides the axial outer surface of the seal gland. The corner adjoining the surfaces 15, 16 is smoothly rounded at 15a. Cutter 20 has a cylindrical surface 25 providing the radially outward surface of the seal gland, and a radial surface 26 which provides the axially inward surface of the seal gland. The bearing seal, which in accordance with the invention is a composite member or structure, is identified by numeral 40. The composite seal structure 40 includes an annular metallic core 41, an inner sealing ring 42, and an outer sealing ring 43.

The metallic core 41 has a rectangular and nearly square cross-sectional configuration. The inner sealing ring 42 has a configuration corresponding to the greater part of a circle, as best seen in FIG. 5. The inner ring 42 consists of approximately a half-circle which extends radially inward from the core 41, but the axial thickness of the ring 42 is greater than that of the core 41, and the ring 42 also has arcuate flange portions 42a, 42b, which extend over the respective axial ends of the core member 41. Outer ring 43 has the same cross-sectional configuration as inner ring 42, but is disposed on the radially outward side of the core member 41. The outer ring 43, of course, has a larger circumference than inner ring 42.

As shown in FIGS. 3 and 4, the metal core member 41 is provided with four equally spaced pin holes 41a, 41b, 41c, 41d on one of its axial sides. In the manufacturing process the surface of metal core member 41 is prepared in a suitable manner for bonding of the sealing rings thereto. The metal surface is first etched by sandblasting, or by chemical action, or by electrochemical action, as preferred. Then a layer or coating of a bonding agent 44 as shown in FIG. 5 is applied to all surfaces of the core member, and this coating action may conveniently be achieved by dipping the core member into a path of an appropriate solution. The core member 41 is then inserted into a suitable mold structure and pins are inserted into the pin holes 41a . . . 41b for holding the core member in position. The mold is then filled with a suitable molten material which, when it solidifies, will provide a flexible sealing medium having elastomeric characteristics. The molten material may, for example, be a suitable type of rubber which when it hardens will have a durometer hardness of 60 to 80, Shore A.

Operation of the bearing seal may best be understood with reference to FIGS. 2 and 6 of the drawings. In FIG. 6 the dotted lines 42', 43' illustrate the relaxed positions of the sealing rings prior to their insertion into the seal gland. A significant amount of radial compression or squeeze of both rings is required in order to complete the assembly. A space 35 on the interior or lubrication side of the seal is then filled with a lubricant; and when the rock bit is operating in a well bore the space 36 on the exterior or well bore side of the seal will become filled with drilling fluid. There is a gap between the inner and outer sealing rings on the exterior side of the seal, and this gap between the ring flanges 42a, 43a as best seen in FIG. 5 results in an annular surface portion 45 of the metallic core 41 being in direct communication with the drilling fluid. Due to rotation of the cutter there is a continuous interchange or flow of the drilling fluid, thus establishing a heat-conductive relationship between the metallic core 41 and the drilling fluid located in the well bore. This heat dissipating relationship serves to maintain a relatively low operating temperature for the composite seal structure 40.

In the preferred embodiment of the invention as shown in FIGS. 1 through 6, inclusive, the method of manufacture of the composite seal structure 40 produces an actual molecular bond between the inner and outer seal rings and the metallic core 41. The molecular bond is very secure, and extends throughout the entire circumference of the metallic core 41, and therefore precludes movement of the bonded surfaces of the sealing rings in either radical, axial, or circumferential directions.

In the preferred form of the invention as shown in FIGS. 1 through 6, inclusive, the cross-sectional area of metallic core 41 is nearly equal to the cross-sectional area of each of the sealing rings 42, 43. This degree of size and strength of the metallic core member is desirable in order to maintain the maximum dimensional stability of the sealing rings. Furthermore, it provides an improved control over the squeeze or interference fit, of the sealing rings.

The improved control over the squeeze, or interference fit, comes in a variety of different ways. One reason is that the radially inward sealing surface of the inner sealing ring 42 is totally independent of the radially outer sealing surface that is provided by the outer sealing ring 43, being fully and totally supported by the metallic core 41. The reverse relationship also applies. Thus, each sealing surface operates entirely independently of the other.

Another reason is that the radial dimension of each sealing ring is reduced from what it would otherwise have to be, and the reduction in radial thickness of the sealing ring is represented by the metallic core 41 which is substituted for a flexible medium. As the drilling in the well proceeds to greater depths, and the ambient pressure level rises by thousands of pounds per square inch, each sealing ring will yield and be compressed to some extent but the metallic core 41 will not. Since the operational effect of changes in the ambient pressure is reduced, it is easier to design the sealing ring for optimum squeeze or interference.

Another factor of great importance is that conventional O-rings when subjected to heavy mechanical stress will not only distort in the way that is desired, but will at the same time distort in many different ways that are undesired. These undesired distortions are described as waving, spiraling, galling, and the like. According to the present invention these undesired distortions of each of the rings 42, 43 are greatly diminished because of the rigid support and dimensional stability that is provided by the metallic core 41. With particular reference to FIG. 5, it will be appreciated that the depending flange portions such as 42a, 42b of the inner sealing ring 42, being securely bonded to the axial sides of the metallic core 41, have a significant tendency to restrict or prevent any twisting or spiraling movement of the ring 42. The same is true of the flanges 43a, 43b of the ring 43.

In the preferred form of the invention as shown in FIGS. 1 through 6, inclusive, the composite seal structure 40 is radially disposed with the inner and outer rings 42, 43 lying in the same plane as the metallic core 41. The radial diameter of the composite seal is at least 1½ times its axial thickness.

ALTERNATE FORMS

FIG. 7 shows a composite seal structure 50 having metallic core 51, inner ring 52, and outer ring 53 which are the same configurations as their counterparts of FIG. 2. However, composite structure 50 is arranged axially rather than radially; that is, the two sealing rings lie in a common cylinder rather than in a common plane.

FIG. 8 shows a modified composite seal 60 which is similar to the seal 40. The metallic core 61 is generally rectangular but has grooves formed in both its upper and its lower surfaces, and the grooves are widened at the bottom so that the sealing rings when formed about the core are secured by a wedging action in addition to the modular bonding of the surfaces.

FIG. 9 shows a composite seal structure 70 in which the metallic core 71 is of cylindrical configuration, and the inner and outer sealing rings 72, 73 are integrally formed as a cylindrical structure which encapsulates the metallic core.

FIG. 10 shows a sealing structure 80 similar to the sealing structure 40, metallic core 81 being identical to metallic core 41 and the exposed gap 85 being identical to gap 45. However, the radially inward and outer surfaces of the sealing rings 82, 83 are cut off flat in the axial direction rather than being rounded.

FIG. 11 shows a seal structure 90 which is similar to the seal structure 40. The modification here is essentially the reverse of that shown in FIG. 8. That is, the upper and lower surfaces of the metallic core 91 have projecting ridges about which the sealing rings 92, 93 are formed.

FIG. 12 shows a seal structure 100 which is similar to the seal structure 40, but metallic core 101 has a groove 101a in its exterior axial side to enhance the heat-dissipating relationship with drilling fluid through the exterior seal space 36.

FIG. 13 shows a composite seal 110 having a metallic core 111 which is square, with a star-shaped sealing member formed around it as a single integral member to provide both the inner ring 112 and the outer ring 113. Each of the sealing rings therefore has two separate legs or branches.

FIG. 14 shows a composite seal structure 120 in which a triangular metallic core 121 is surrounded by a triangular resilient member which provides both inner sealing portion 122 and outer sealing 123.

FIG. 15 shows a seal structure 130 similar to the seal structure 40 of FIG. 5, but with the axial sides of the metallic core member 131 being notched as at 135 between the seal rings 132, 133.

FIG. 16 shows a composite seal structure 140 having a metallic core 141, inner sealing ring 142, and outer sealing ring 143, with annular gap 145 providing heat-dissipating contact with the metallic core 141. Outer ring 143 has a configuration similar to the sealing ring 43 previously described. The inner sealing ring 142, however, is bifurcated in the axial direction, having an axially inner leg 142a and an axially outer leg 142b.

FIG. 17 shows a modification of the invention in which the sealing structure 40 is used in conjunction with a pair of back-up rings 46, 47. The back-up rings are preferably made of teflon. Back-up ring 47 on the exterior side of the seal reduces the heat dissipating capability, and it may therefore be desired to omit back-up ring 47 and use only the back-up ring 46.

FIG. 18 shows a composite seal structure 150 in which the configurations of the sealing rings are again unsymmetrical, but according to a different pattern than shown in FIG. 14 or FIG. 16. Both the inner ring 152 and the outer ring 153 are in the form of the larger part of a circle, having flanges which extend about the axial sides of the metallic core 151. However, the inner sealing ring 152 has a relatively large radial diameter *a* while the outer ring 153 has a relatively small radial diameter *b*.

It is in general economical to make both the inner sealing ring and the outer sealing ring of the same material, however, as indicated in FIG. 15 it may be preferred to make a clear separation between these two parts in the mold, and to mold each ring in a separate operation using a somewhat different material from that which is used in the other ring.

The invention has been disclosed in considerable detail in order to comply with the patent laws by providing a full public disclosure of at least one of its forms. However, such detailed description is not intended in any way to limit the scope of patent monopoly to be granted.

What is claimed is:

1. An earth boring tool comprising:
   a. a bit body having at least one journal leg thereon;
   b. a rotary cutter rotatably mounted upon said journal leg;
   said journal leg having surface portions providing the radially inward surface and the axially outward surface of a seal gland, said cutter having surfaces providing the radially outward surface and the axially inward surface of the seal gland; and
   c. an annular seal disposed within said seal gland, said annular seal including
      1. an annular solid circumferentially continuous metallic core,
      2. an inner sealing ring portion of flexible material having elastomeric characteristics and being bonded to the radially inward side of said metallic core throughout substantially the entire circumference thereof, said inner ring portion engaging said radially inward surface of the seal gland, and
      3. an outer sealing ring portion of flexible material having elastomeric characteristics and being bonded to the radially outward surface of said metallic core throughout substantially the entire circumference thereof and engaging said radially outward surface of the seal gland;
   said inner and outer sealing ring portions being of substantially the same corss-sectional area and having substantially the same exposed surface in moving sealing engagement with respectively adjacent surface portions of the seal gland,
   said metallic core serving to maintain the dimensional stability of both said inner and said outer sealing ring portions despite high levels of temperature and pressure applied to both the interior and exterior sides of said seal.

2. An earth boring tool as in claim 1 wherein the radial diameter of said seal is at least one and one half times the axial length thereof.

3. An earth boring tool as in claim 1 wherein the cross-sectional area of said metallic core is substantially equal to the cross-sectional area of each of said sealing ring portions.

4. An earth boring tool as in claim 3 wherein the axial length of each of said sealing ring portions is greater than the axial length of said metallic core, thereby preventing metal-to-metal contact with said core.

5. An earth boring tool as in claim 1 wherein the axial length of each of said sealing ring portions is greater than the axial length of said metallic core, thereby preventing metal-to-metal contact with said core.

6. An earth boring tool as in claim 1 wherein said sealing ring portions are integrally formed as a single member.

7. An earth boring tool as claimed in claim 1 wherein said metallic core is of rectangular cross-sectional configuration and each of said sealing ring portions has a cross-sectional configuration comprising the greater part of a circle.

8. An earth boring tool as in claim 1 wherein portions of the exterior of said metallic core are substantially exposed whereby drilling fluid surrounding said boring tool is adapted to contact said core to convey heat away from said annular seal.

9. An earth boring tool as claimed in claim 8 wherein said metallic core is of rectangular cross-sectional configuration and each of said sealing ring portions has a cross-sectional configuration comprising the greater part of a circle.

10. In a rock bit having a bit body with at least one journal leg, a seal between the journal leg and the rotary cutter, said seal comprising:
    an annular metallic core;
    inner and outer sealing ring portions of flexible material having elastomeric characteristics;
    said sealing ring portions being disposed in opposite sides of said core, said inner ring portion having an annular engagement surface for a corresponding portion of the journal leg and said outer ring portion having an annular engagement surface for a corresponding portion of the cutter; and
    each of said sealing ring portions being bonded to said core throughout substantially the entire circumference thereof, whereby said core maintains the dimensional stability of said sealing ring portions despite high levels of temperature and pressure to which said seal is subjected, said engagement surface for the journal leg having an initial diameter greater than the diameter of the corresponding portion of the journal leg and said engagement surface for the cutter having a diameter greater than the diameter of the corresponding portion of the cutter whereby to compress said sealing ring portions between the journal leg and the cutter and in a direction transverse to the circumferential center line of said core.

11. The rock bit of claim 10 wherein said core, said inner sealing ring portion, and said outer sealing ring portion lie in a common plane.

12. The rock bit of claim 11 wherein the radial diameter of said seal is greater than its axial length.

13. The rock bit of claim 11 wherein the radial diameter of said seal is at least one and one-half times the axial length thereof.

14. The rock bit of claim 10 wherein the cross-sectional area of said metallic core is substantially equal to the cross-sectional area of each of said sealing portions.

15. The rock bit of claim 10 wherein said two sealing ring portions are integrally formed as a single member.

16. The rock bit of claim 10 wherein each of said sealing ring portions extends outward in three directions from the surfaces of the associated sides of said metallic core, thereby protecting said core from metal-to-metal contact.

17. The rock bit of claim 16 wherein on the exterior side of said seal there is a gap between said sealing ring portions through which said metallic core is exposed to drilling fluid in the well bore, thereby cooling said seal portions.

18. The rock bit of claim 10 wherein said inner sealing ring portion is made of a different material than said outer sealing ring portions.

19. The rock bit of claim 18 wherein said inner sealing ring portion has a different hardness value than said outer sealing ring portion 20. The rock bit of claim 10 wherein said inner and outer sealing ring portions are of differing cross-sectional configurations.

21. The rock bit of claim 10 wherein on the exterior side of said seal there is a gap between said sealing ring portions through which said metallic core is exposed to drilling fluid in the well bore, thereby cooling said seal.

22. The rock bit of claim 21 wherein said metallic core has a U-shaped cross-sectional configuration, with the groove thereof lying on the exterior side of said seal in communication with said gap.

* * * * *

UNITED STATES PATENT OFFICE
CERTIFICATE OF CORRECTION

PATENT NO. : 3,944,306
DATED : March 16, 1976
INVENTOR(S) : William J. Neilson

It is certified that error appears in the above-identified patent and that said Letters Patent are hereby corrected as shown below:

Column 7, line 53, change "corss-sectional" to --cross-sectional--;

Column 8, line 33, change "in" to --on--;

line 46, change "greater" to --less--;

Column 9, line 13, change "portions" to --portion--;

Column 10, line 3, after "portion" insert --.--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*